United States Patent [19]
Tange

[11] Patent Number: 6,126,323
[45] Date of Patent: Oct. 3, 2000

[54] HEADSET ASSEMBLY FOR A BICYCLE

[76] Inventor: Satoshi Tange, No. 128, Yinghua Rd, Taichung, Taiwan

[21] Appl. No.: 09/231,646

[22] Filed: Jan. 15, 1999

[51] Int. Cl.[7] .................................................. B62K 21/06
[52] U.S. Cl. .......................................... 384/545; 280/279
[58] Field of Search .................................. 384/545, 538; 280/279, 280; 74/551.1

[56] References Cited

U.S. PATENT DOCUMENTS

| | | | |
|---|---|---|---|
| 5,330,220 | 7/1994 | Nagano | 280/279 |
| 5,353,888 | 10/1994 | Tsukahara | 280/279 X |
| 5,405,202 | 4/1995 | Chi | 384/545 |
| 5,544,905 | 8/1996 | Chen | 280/279 |
| 5,681,119 | 10/1997 | Marui | 384/545 |
| 5,775,709 | 7/1998 | Chen | 280/279 |
| 5,800,071 | 9/1998 | Chi | 384/545 X |
| 5,979,925 | 11/1999 | Lin | 280/279 |

*Primary Examiner*—Thomas R. Hannon
*Attorney, Agent, or Firm*—Bacon & Thomas

[57] ABSTRACT

A headset assembly includes a race having a flange which rests on an end of the head tube and an annular recess defined in the inner periphery thereof so as to receive a bearing therein. The bearing has a first tapered surface defined in the top of the inner periphery thereof so as to engage with the second tapered surface of the cap which is mounted to the flange and the bearing. The cap has a third tapered surface defined in the top thereof so as to engage with a fourth tapered surface of a compressing ring which is pressed by the handlebar stem which is securely mounted to the steering tube extending through the bearing, the cap and the compressing ring.

7 Claims, 3 Drawing Sheets

HEADSET ASSEMBLY FOR A BICYCLE

FIELD OF THE INVENTION

The present invention relates to a headset assembly, and more particularly, to an improved headset assembly for a bicycle. The headset assembly comprises a race having a flange rested on the top end of a head tube and a bearing which is received in an annular recess of the race wherein the bearing is completely received in the head tube.

BACKGROUND OF THE INVENTION

A conventional headset for a bicycle generally comprises a race with a bearing engaged thereto, a steering tube which rotatably extends through the bearing and a handlebar stem which is connected to the steering tube. The race has an annular recess for receiving the bearing. The bottom of the race defines the annular recess which generally extends radially outward from the top end of the head tube to which an upper headset and a lower headset are attached. The bottom of the race which defines the annular recess makes the shape of the headset assembly unattractive. Furthermore, a protruding portion of the bearing is prone to receive impacts from the outside especially when used in mountain bikes. It would be difficult to repair deformation of the race and the bottom of the annular recess caused by such impacts. A headset assembly whose bearing is completely received in the head tube and the headset assembly is disclosed in U.S. Pat. No. 5,246,297, entitled as "JOURNAL FOR A FRAME FORK OF A BICYCLE" issued on Sep. 21,1993to Chi. Chi discloses a headset assembly which is used on a steering tube having a toothed portion defined in the outside thereof. The head tube of Chi's invention has to be specially designed to have a shoulder portion defined in the inside of the top thereof so as to receive the bearing therein. Therefore, such a head tube is totally different from that of the conventional one so that a high price is incurred. In addition, the bearing in the shoulder portion has to be pressed or positioned by an annular member which is threadedly mounted to the steering tube and presses the bearing. The annular member is also received in the head tube so that it is difficult to be accessed by a tool when maintenance is required. In addition, Chi's invention cannot be used on the steering which lacks a toothed portion defined in the outside thereof.

The present invention provides a headset assembly which is used on a smooth steering tube and which receives the bearing in the head tube. Furthermore, the headset assembly of the present invention is easily and conveniently maintained. Accordingly, the headset of the present invention has been developed to mitigate and/or obviate the shortcomings of the conventional headset assemblies.

SUMMARY OF THE INVENTION

In accordance with one aspect of the present invention, there is provided a headset assembly comprising a ring-shaped race having an annular recess defined in the inner periphery thereof and a flange extending from the top edge thereof. The flange rests on one of two ends of the head tube. A ring-shaped bearing is engaged with the annular recess and has a first tapered surface defined in the top of the inner periphery thereof for engagement with a second tapered surface of a ring-shaped cap mounted to the flange and the bearing. The cap further has a third tapered surface defined in the top of the inner periphery thereof. A compressing ring has a fourth tapered surface defined in the outside thereof so as to be engaged with the third tapered surface of the cap, and is compressed by a handlebar stem mounted to the steering tube. The object of the present invention is to provide a headset for a bicycle wherein the bearing of the headset is completely received in the head tube and the bearing is conveniently accessed.

Another embodiment of the present invention is to provide a headset for a bicycle wherein the bearing of the headset is engaged with a non-externally threaded steering tube.

Further features of the present invention will become apparent after a careful reading of the detailed description with appropriate reference to the accompanying drawings.

DETAILED DESCRIPTION OF THE PREFERRED EMBODIMENT

Figure 1:
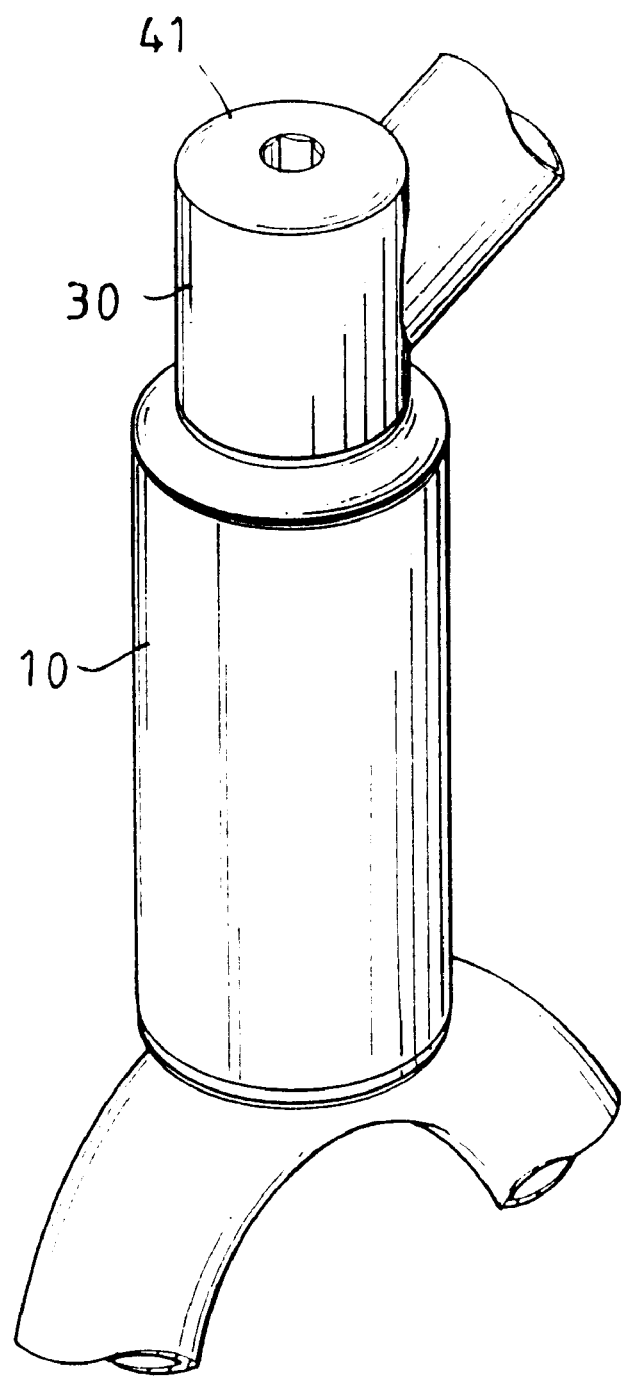
FIG. 1 is a perspective view of the combination of the headset assembly, the head tube and the steering tube in accordance with the present invention.
Figure 2:
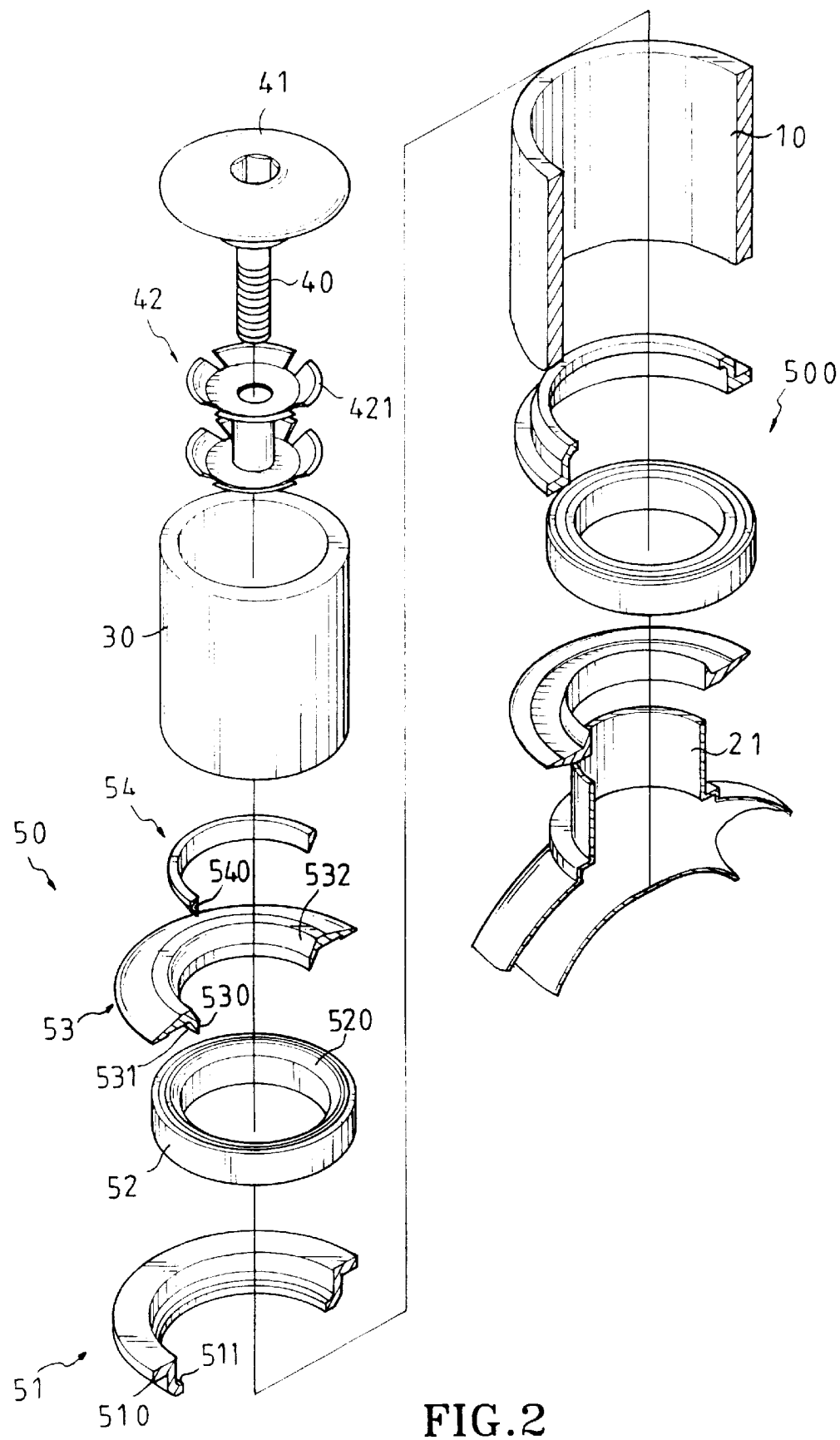
FIG. 2 is an exploded view of the headset assembly in accordance with the present invention.
Figure 3:
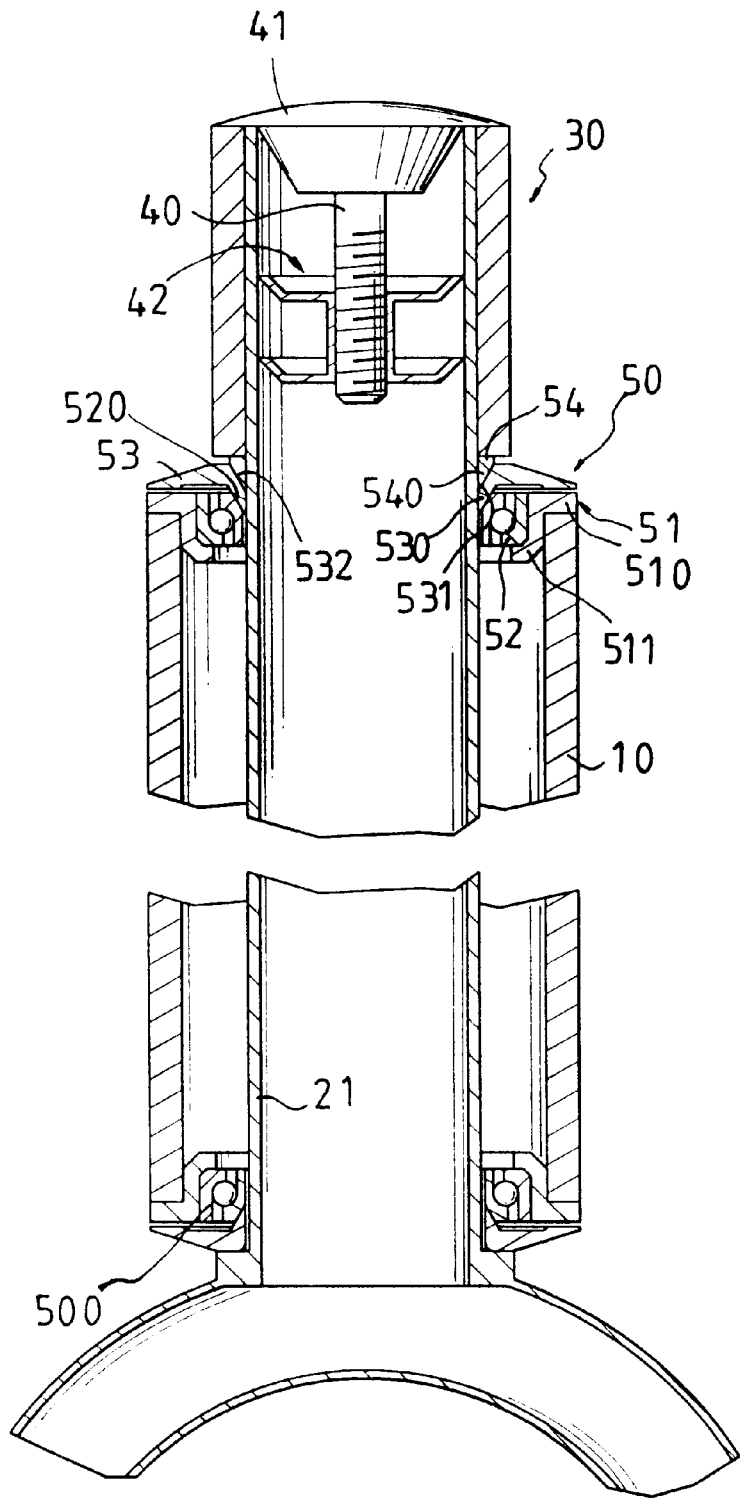
FIG. 3 is a side elevational view, partly in section, of the combination of the headset assembly, the head tube and the steering tube in accordance with the present invention.

Referring to FIGS. 1 to 3, the headset assembly in accordance with the present invention comprises a head tube 10 through which a steering tube 21 such as a non-externally threaded steering tube 21 extends with an upper headset assembly 50 and a lower headset assembly 500 respectively attached to the two ends of the head tube 10 so that the steering tube 21 can be rotated relative to the head tube 10. Each of the upper headset assembly 50 and the lower headset assembly 500 comprises a ring-shaped race 51 having an annular recess 511 defined in the inner periphery thereof and a flange 510 extending from the top edge thereof. The flange 510 rests on one of two ends of the head tube 10 and is flush with the outside of the head tube 10.

A ring-shaped bearing 52 is engaged with the annular recess 511 of the race 51 and is securely mounted to the steering tube 21. The bearing 52 has a first tapered surface 520 defined in the top of the inner periphery thereof.

A ring-shaped cap 53 is mounted to the flange 510 and the bearing 52 so as to prevent dust and/or rain drops from entering into the bearing 52. The cap 53 has an insertion 530 extending therefrom which has a second tapered surface 531 defined in the outside thereof so as to be engaged with the first tapered surface 520 of the bearing 52. A third tapered surface 532 is defined in the top of the inner periphery of the bearing 52.

A compressing ring 54 mounted to the steering tube 21 has a fourth tapered surface 540 defined in the outside thereof so as to be engaged with the third tapered surface 532 of the cap 53.

A handlebar stem 30 is mounted to the steering tube 21 and is compressed onto the compressing ring 54. An urging member 42 having at least two expandable wings 421 are received in the steering tube 21 and a bolt 40 threadedly extends through the urging member 42 to make the expandable wings 421 contact against the inside of the steering tube 21. The bolt 40 has a head portion 41 which is engaged on the top of the handlebar stem 30 and the steering tube 21 so as to press the handlebar stem 30 onto the compressing ring 54.

Accordingly, the headset assembly in accordance with the present invention can be used on the non-externally threaded steering tube 21 and the bearing 52 is completely received in the head tube 10 and covered by the cap 53. Furthermore, the bearing 52 is easily accessed by simply unthreading the bolt 40 from the handlebar stem 30.

It is to be understood that the above description and drawings are only used for illustrating some embodiments of the present invention, not intended to limit the scope thereof. Any variation and derivation from the above description and drawings should be included in the scope of the present invention.

What is claimed is:

1. A headset assembly comprising:

a ring-shaped race having an annular recess defined in the inner periphery thereof and a flange extending from the top edge thereof, said flange adapted to be rested on one of two ends of the head tube;

a ring-shaped bearing engaged with said annular recess of said race and having a first tapered surface defined in the top of the inner periphery thereof;

a ring-shaped cap mounted to said flange and said bearing and having an insertion extending therefrom which has a second tapered surface defined in the outside thereof so as to be engaged with said first tapered surface of said bearing, a third tapered surface defined in the top of the inner periphery thereof, and a compressing ring having a fourth tapered surface defined in the outside thereof so as to be engaged with said third tapered surface of said cap.

2. The headset assembly as claimed in claim 1, wherein said flange is adapted to be flush with said outside of said head tube.

3. A headset assembly comprising:

a head tube;

a ring-shaped race having an annular recess defined in the inner periphery thereof and a flange extending from the top edge thereof, said flange rested on one of two ends of the head tube;

a ring-shaped bearing engaged with said annular recess of said race and having a first tapered surface defined in the top of the inner periphery thereof;

a ring-shaped cap mounted to said flange and said bearing and having an insertion extending therefrom which has a second tapered surface defined in the outside thereof so as to be engaged with said first tapered surface of said bearing, a third tapered surface defined in the top of the inner periphery thereof;

a compressing ring having a fourth tapered surface defined in the outside thereof so as to be engaged with said third tapered surface of said cap, and a steering tube extending through said bearing, said cap and said compressing ring.

4. The headset assembly as claimed in claim 3, wherein said flange is adapted to be flush with said outside of said head tube.

5. The headset assembly as claimed in claim 3 further comprising a handlebar stem mounted to said steering tube and compressing onto said compressing ring.

6. The headset assembly as claimed in claim 5 further comprising an urging member received in said steering tube and a bolt threadedly extending through said urging member, said bolt having a head portion which is engaged on the top of said handlebar stem and said steering tube.

7. The headset assembly as claimed in claim 3, wherein said steering tube is a non-externally threaded tube.

* * * * *

(12) REEXAMINATION CERTIFICATE (4646th)
United States Patent
Tange

(10) Number: US 6,126,323 C1
(45) Certificate Issued: Sep. 17, 2002

(54) HEADSET ASSEMBLY FOR A BICYCLE

(75) Inventor: Satoshi Tange, No. 128, Yinghua Rd., Taichung (TW)

(73) Assignee: Satoshi Tange, Taichung (TW)

Reexamination Request:
No. 90/006,046, Jul. 2, 2001

Reexamination Certificate for:
Patent No.: 6,126,323
Issued: Oct. 3, 2000
Appl. No.: 09/231,646
Filed: Jan. 15, 1999

(51) Int. Cl.⁷ .............................................. B62K 21/06
(52) U.S. Cl. ...................................... 384/545; 280/279

(56) References Cited

U.S. PATENT DOCUMENTS

| | | |
|---|---|---|
| 573,316 A | 12/1896 | Willits |
| 2,310,064 A | 2/1943 | Conti |
| 5,319,993 A | 6/1994 | Chiang |

OTHER PUBLICATIONS

Tange, Threadless Headset, Techno Glide, Apr. 1997.
Dia–Compe USA, Product Catalog, 1993, Printed in USA, pp. 1–34.
Dia–Compe USA, Brochure, The Aheadset System and the Threadhead System (no date).
Tange Seiki Bicycle Components, Catalog, pp. 1–14 (no date).

*Primary Examiner*—Lenard A. Foodland

(57) ABSTRACT

A headset assembly includes a race having a flange which rests on an end of the head tube and an annular recess defined in the inner periphery thereof so as to receive a bearing therein. The bearing has a first tapered surface defined in the top of the inner periphery thereof so as to engage with the second tapered surface of the cap which is mounted to the flange and the bearing. The cap has a third tapered surface defined in the top thereof so as to engage with a fourth tapered surface of a compressing ring which is pressed by the handlebar stem which is securely mounted to the steering tube extending through the bearing, the cap and the compressing ring.

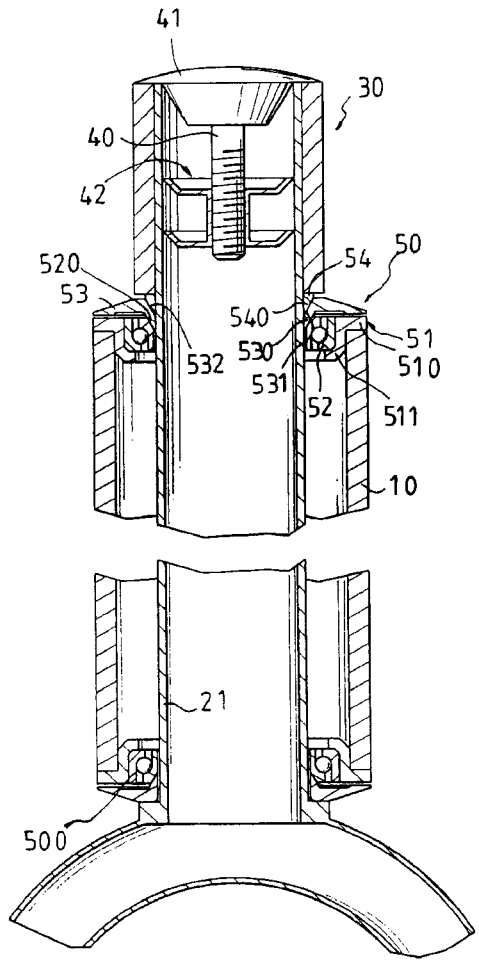

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *